Patented Oct. 3, 1950

2,524,319

UNITED STATES PATENT OFFICE 2,524,319

PROCESS OF PRODUCING LARGER CYANO-ALKANES FROM SMALLER ONES

Morris S. Kharasch, Chicago, Ill., assignor to Eli Lilly and Company, Indianapolis, Ind., a corporation of Indiana No Drawing. Application July 11, 1949, Serial No. 104,144

11 Claims. (Cl. 260—465)

This invention relates to a process for producing larger cyanoalkanes which have a plurality of cyano (—CN) groups from smaller cyanoalkanes which have fewer cyano groups; and especially for producing dicyanoalkanes (succinonitriles) from monocyanoalkanes. The cyanoalkanes, both those with the higher and those with the lower numbers of cyano groups, include phenyl-substituted cyanoalkanes (phenyl) alkyl cyanides), in which there are one or more phenyl substituents on the alkane.

In the initial smaller cyanoalkanes the alkane part must have a hydrogen-carrying aprimary carbon atom (defined below) linked directly to a cyano group, and carrying either one or two hydrogen atoms; and in my process a hydrogen atom is removed from such an aprimary carbon atom, and the radicals resulting from such hydrogen removal are linked together.

The present application is a continuation-in-part of my co-pending application Serial No. 581,946, filed March 9, 1945, and now patent No. 2,477,671, granted August 2, 1949; which in turn was filed as a continuation-in-part of my application Serial No. 503,172, filed September 20, 1943, and now Patent No. 2,426,224, granted August 26, 1947.

In carrying out my present invention, I treat the smaller cyanoalkanes at elevated temperature and in the substantial absence of water with a diacyl peroxide in which at least one of the acyl groups is an alkacyl group of not more than four carbon atoms; preferably with diacetyl peroxide. The diacyl peroxide is desirably a dialkacyl peroxide—that is, (as defined below), one containing two alkacyl groups, such as acetyl, propionyl, or butyryl. But the diacyl peroxide may be an aralkacyl peroxide (defined below), for it is necessary only that there be one alkacyl group, so that the second acyl group may if desired be an aracyl group, such for instance as benzoyl. The diacyl peroxide used can not be a diaracyl peroxide.

As used in this specification and its appended claims:

*a.* By "alkacyl group" I mean the acyl group of an alkyl carboxylic acid;

*b.* By "aracyl group" I mean the acyl group of an aromatic carboxylic acid;

*c.* By "dialkacyl peroxide" I mean a peroxide which both acyl groups attached to the bivalent —O—O— group are alkacyl groups;

*d.* By "diaracyl peroxide" I mean a peroxide in which both acyl groups attached to the bivalent —O—O— group are aracyl groups;

*e.* By "ar-alkacyl peroxide" I mean a peroxide in which one acyl group attached to the bivalent —O—O— group is an alkacyl group and the other is an aracyl group.

*f.* By "aprimary carbon atom" I mean a carbon atom of the class consisting of secondary and tertiary carbon atoms.

*g.* By "primary or secondary or tertiary hydrogen atoms" I mean hydrogen atoms directly attached to primary or secondary or tertiary carbon atoms respectively;

*h.* By "aprimary hydrogen atom" I mean a hydrogen atom of the class consisting of secondary and tertiary hydrogen atoms; and

*i.* By "cyanoalkane" I mean an alkane having at least one cyano group attached directly to a carbon atom of the alkane; whether or not the alkane also has a phenyl group attached to it either at the same carbon atom or a different carbon atom.

The preferred diacyl peroxide, as already noted, is diacetyl peroxide; which is effective in all cases and gives the highest yields. I can use dipropionyl peroxide and dibutyryl peroxide fairly effectively, the former more effectively than the latter; and I can use diisobutyryl peroxide, but much less effectively and with rather poor results in some cases.

The diacyl peroxide does not itself combine with the initial smaller cyanoalkanes. Instead, it acts exclusively to remove aprimary hydrogen atoms from them; whereupon the radicals remaining after that removal of aprimary hydrogen atoms from the smaller cyanoalkanes unite one with another by single carbon-to-carbon bonds, to produce larger cyanoalkanes (polycyanoalkanes) which save for the absence of the removed aprimary hydrogen atoms are polymers constituting the sum of two or more original smaller aryalkanes.

The initial smaller cyanoalkanes to which my invention is applicable are the lower cyanoalkanes (with one or more cyano substituents) having not to exceed 12 carbon atoms, and in which a cyano group is directly attached to an aprimary alkane carbon atom carrying one or two hydrogen atoms, whether or not the alkane has also a phenyl substituent. The alkane may be methane provided its single carbon atom has directly attached to it not only the cyano group but also a phenyl group, as in benzyl cyanide; but usually the alkane will have at least two alkane carbon atoms, in order to make one which carries the cyano group an aprimary carbon atom. This aprimary carbon atom must carry at least one hydrogen atom, which is all it can carry if the aprimary carbon atom is a tertiary carbon atom; but if that aprimary carbon is a secondary carbon atom it may carry two hydrogen atoms.

In the reaction produced according to my process, in which a smaller cyanoalkane is treated with a diacyl peroxide having at least one of its acyl groups an alkacyl group, the diacyl peroxide (most desirably diacetyl peroxide) does not combine with the smaller cyanoalkane, as has already been stated. But neither does it act as a mere catalyst, for the reaction that involves the smaller cyanoalkane depends completely for its extent upon the amount of diacyl peroxide used. Further, the action of the diacyl peroxide used is entirely different from the action of either hydrogen peroxide or dibenzoyl peroxide.

What happens in the reaction of the diacyl peroxide (using diacetyl peroxide as an example) and a smaller cyanoalkane is represented by the following series of formulas:

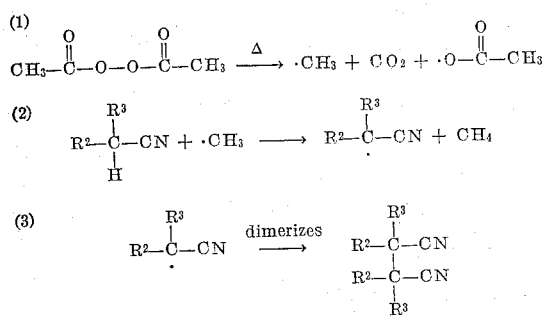

in which at least one and permissibly each of $R^2$ and $R^3$ is a radical containing a carbon atom directly attached to the carbon atom shown and of the class consisting of the phenyl group, alkyl groups having not more than 10 carbon atoms, and such alkyl groups with one or more phenyl substituents—if only one of $R^2$ and $R^3$ is such a radical, the other may be hydrogen.

Equation 1 represents a decomposition of the diacetyl peroxide into carbon dioxide, a free methyl radical, and a free acetoxy radical. Equation 2 represents the abstraction by the free methyl radical of an aprimary hydrogen atom from the initial smaller cyanoalkane, to produce methane and the free radical of that initial smaller cyanoalkane. Equation 3 represents the combining (dimerizing) of two of the free radicals of the initial smaller cyanoalkane, to form a new carbon-to-carbon bond, thus producing a larger cyanoalkane having double the number of carbon atoms and double the number of cyano groups of the initial smaller cyanoalkane.

By limiting the amount of diacetyl peroxide added, the larger cyanoalkane of double the number of carbon atoms and double the number of cyano groups may be obtained in high yields, often of the order of 90% to 100% of the amount calculated on the basis of the diacetyl peroxide used.

The larger cyanoalkane with double the number of carbon atoms and double the number of cyano groups may in turn be treated with a suitable diacyl peroxide (desirably diacetyl peroxide) to produce a second doubling, provided that after the first doubling there still remains in the alkane a hydrogen-carrying aprimary carbon atom directly attached to a cyano group; that aprimary carbon atom may be the same one as in the initial reaction if in the initial cyanoalkane it was a secondary carbon atom carrying two hydrogen atoms, but not if it was a tertiary carbon atom, which can carry only a single hydrogen atom. Further, again with the same proviso, by using a larger quantity of the diacyl peroxide in the initial reaction with the original cyanoalkane, it is possible to get mixtures in which in addition to cyanoalkanes of double the number of carbon atoms and cyano groups there are compounds of higher multiples of the original number of carbon atoms and cyano groups, such as treble the number, quadruple the number, quintuple the number, etc. With some initial cyanoalkanes it is possible to limit substantially the multiplying of the number of carbon atoms and cyano groups to threefold (the trimer); but generally the multiplying of the number of carbon atoms and cyano groups is to double the number (the dimer) or to quadruple the number of carbon atoms and cyano groups (the tetramer, or the dimer of the dimer).

In some cases, when the cyanoalkane treated with a diacyl peroxide contains more than one aprimary hydrogen atom, a mixture of two or more dimeric substances will result.

In carrying out the general reaction with the diacyl peroxide (desirably diacetyl peroxide) it is usually desirable first to dissolve the diacyl peroxide, in the cold (desirably about 10° C.), in a small portion of the initial smaller cyanoalkane to be treated if that initial cyanoalkane is liquid, and then to add that solution very slowly, desirably drop by drop, in the substantial absence of water, to a larger quantity of the initial cyanoalkane. If only the dimer is desired, there is generally a several-fold molecular excess of the initial cyanoalkane to be treated over the diacyl peroxide.

Alternatively, the diacyl peroxide may be dissolved in the cold in a suitable solvent, such as carbon tetrachloride, and that cold solution may be added slowly to a heated and concentrated solution in the same solvent of the initial smaller cyanoalkane to be treated. But the reaction in a third substance as a solvent is usually less desirable than when the only compounds present are the diacyl peroxide and the cyanoalkane to be treated.

The following are typical examples of the process of this invention, resulting in some instances in products which are themselves new.

*Example 1.—Preparation of α,β-dimethylsuccinonitrile*

In this example propionitrile is the initial cyanoalkane. In it the alkane carbon atom to which the cyano group is attached is a secondary carbon atom, and carries two aprimary hydrogen atoms, which are thus secondary hydrogen atoms.

Diacetyl peroxide, dissolved in propionitrile or in carbon tetrachloride, is added slowly to proprionitrile (3-5 molecular equivalents on the basis of the diacetyl peroxide used) maintained at 85-95° C. The addition of the peroxide requires about 2-3 hours, and the heating is continued until the reaction mixture no longer gives a test for peroxide. The excess of propionitrile or carbon tetrachloride is removed by distillation at reduced pressure. The material remaining is in large measure the desired α,β-dimethylsuccinonitrile, which may also be called 2,3-dicyanobutane.

The reactions which occur are as follows:

(4)

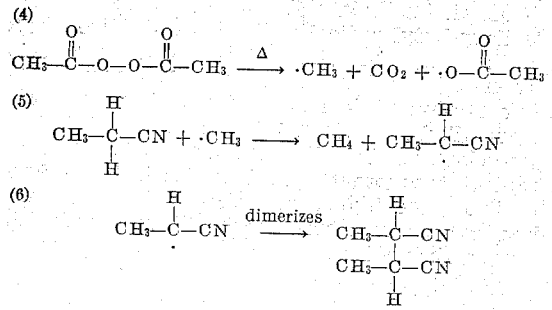

(5)

(6)

Two forms of the dimer, α,β-dimethylsuccinonitrile or 2,3-dicyanobutane, are obtained, the racemic and the meso. These are formed in about equal quantities.

If the amount of diacetyl peroxide used is small in comparison to the amount of the initial propionitrile, the product is almost exclusively the dimer, α,β-dimethylsuccinonitrile; but if larger quantities of diacetyl peroxide are used, the higher polymers (such as the trimer and the tetramer) are also obtained to a greater or lesser extent.

*Example 2.—Preparation of α,β-diphenylsuccinonitrile*

Example 1 is repeated, save that benzyl cyanide, $C_6H_5$—$CH_2$—CN, is used instead of propionitrile. A similar set of reactions occurs, as follows:

(7)

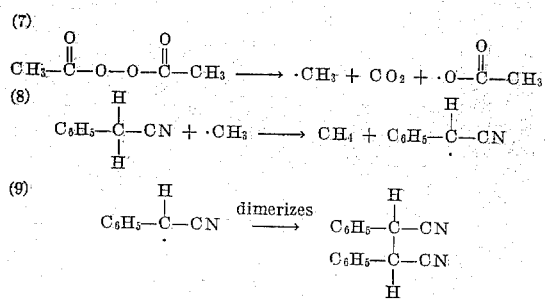

(8)

(9)

The dimer, which is α,β-diphenylsuccinonitrile, or 1,2-diphenyl-1,2-dicyanoethane, also has two forms (racemic and meso); which can readily be separated by making use of their different solubilities in alcohol.

Here again the product obtained may be limited substantially to the dimer, α,β-diphenylsuccinonitrile, by keeping low the amount of diacetyl peroxide used; but higher polymers may be obtained by using larger quantities of the diacetyl peroxide.

*Example 3.—Preparation of α,β-didecylsuccinonitrile*

Nitriles of long-chain aliphatic radicals, such as dodecyl nitrile $CH_3(CH_2)_{10}CN$, can also be dimerized with the aid of diacetyl peroxide. By repeating Example 1 on dodecyl nitrile, for example, the dimer is obtained—α,β-didecylsuccinonitrile. It has the following structure:

(10)

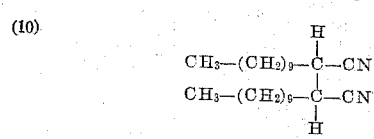

Here again two forms (racemic and meso) of the dimer, α,β-didecylsuccinonitrile, are produced in about equal quantities. Along with these two forms of the dimer, a higher-boiling material is obtained, presumably a mixture of the "trimer" and the "tetramer."

*Example 4*

Example 1 may be repeated with initial cyanoalkanes in which the cyano group is attached to an intermediate carbon atom of an alkyl chain, whether elsewhere branched or not, instead of to an end carbon atom as in Examples 1 and 3; such for instance as 2-cyanopropane, 2-cyanobutane, 3-cyanohexane, 3-cyano-4-methyl octane, 2-cyano-3-propyl heptane, etc., so that the alkane carbon atom to which the cyano group is directly attached is a tertiary carbon atom. The dimers of these, (for only dimers are obtained), as obtained by my treatment with a diacyl peroxide at elevated temperature and in the substantial absence of water, are analogs of that given in Example 1; save that in those dimers the carbon atoms which carry the cyano groups are quaternary carbon atoms instead of tertiary carbon atoms and so carry no hydrogen atoms—because of which fact there are no higher polymers than the dimers. For instance, by repeating Example 1 with 2-cyanopropane, as the initial cyanoalkane, the reactions which occur are as follows:

(11)

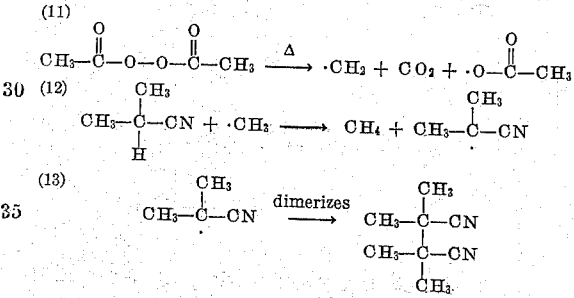

(12)

(13)

This final product is obtained in substantially quantitative yield; and is 2,3-dicyano-2,3-dimethyl butane. It is a white solid.

*Example 5.—Preparation of 2,3-dicyano-2,3-diphenylbutane*

Example 2 is repeated, save that 1-phenyl-1-cyanoethane

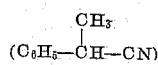

is the initial cyanoalkane instead of benzyl cyanide. Here also the carbon atom carrying the cyano group is a tertiary carbon atom, so that the dimer is the only polymer obtained. The reactions are similar to those of Example 2, as follows:

(14)

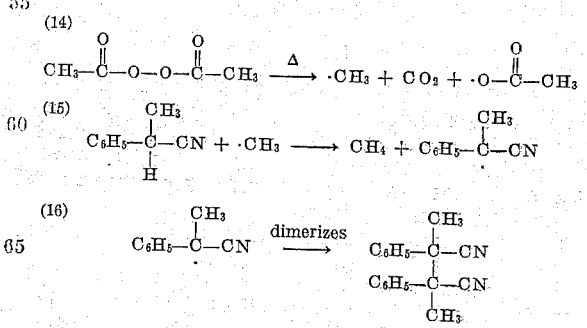

(15)

(16)

This dimer, which is 2,3-dicyano-2,3-diphenylbutane, also has two forms (racemic and meso); which can readily be separated by making use of their different solubilities in alcohol. Here again, as in Example 4, the product obtained is limited to the dimer, because upon the dimerization there remains no a primary hydrogen atom, since both carbon atoms which carry cyano groups are then quaternary carbon atoms.

Example 6

Example 2 may be repeated on other phenyl-substituted cyanoalkanes, both those with a phenyl group and a cyano group attached to the same alkane carbon atom, as in Examples 2 and 5, and those with a phenyl group and a cyano group attached to different alkane carbon atoms. For instance, instead of the propionitrile of Example 2, or the 1-phenyl-1-cyanoethane of Example 5, I may use 1-cyano-2-phenyl ethane, or 2-cyano-3-phenyl pentane, or 2-cyano-5-phenyl octane, etc. If 1-cyano-2-phenyl ethane is used as the initial cyanoalkane, for instance, and is treated with diacetyl peroxide in the manner of previous examples, reactions occur as follows:

(17) 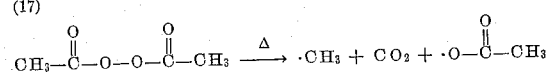

(18) 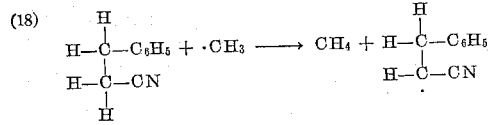

(19) 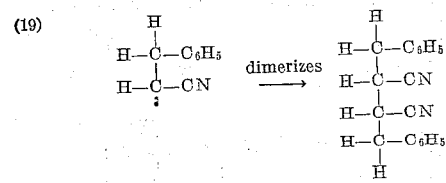

This product of these reactions is the dimer, 1,4-diphenyl-2,3-dicyanobutane.

The phenyl group attached to one of the aprimary carbon atoms of the initial 1-cyano-2-phenylethane also produces some activation, with somewhat different dimerization; to yield a 1,4-dicyano-2,3-diphenylbutane having the following structure:

(20) 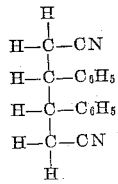

Small amounts of some trimers and tetramers are also formed in this reaction.

Example 7

As already indicated, other dialkacyl peroxides than diacetyl peroxide may be used in Examples 1 to 6. However, while dipropionyl, dibutyryl, and diisobutyryl peroxides will produce the products obtained in those examples, the best results are with diacetyl peroxide.

The dialkacyl peroxide which in all cases gives the best yield of dimers, trimers, and tetramers is diacetyl peroxide; because the free methyl radical which comes from it is the most active of the free alkyl radicals. The activity of other free alkyl radicals, produced in the decomposition of higher dialkacyl peroxides, and therefore the yields of desired dimers, trimers, and tetramers, decreases as one proceeds to the free ethyl radical (from dipropionyl peroxide), the free propyl radical (from di-n-butyryl peroxide), the free isopropyl radical (from diisobutyryl peroxide), and the free tertiarybutyl radical (from ditrimethylacetyl peroxide). Thus the free tertiary-butyl radical is the least reactive of all of these, and the yields of the desired products when it is used are negligible. In general, the free methyl radical is most reactive; free primary-alkyl radicals are more reactive than free secondary-alkyl radicals; free secondary-alkyl radicals are more reactive than free tertiary-alkyl radicals; and free alkyl radicals with fewer carbon atoms are more reactive than those with more carbon atoms.

Example 8

Instead of diacetyl peroxide or other dialkacyl peroxide, an ar-alkacyl peroxide (or aromatic-aliphatic peroxide) may be used; such for instance as acetyl benzoyl peroxide. The initial reaction in this case, to produce the free methyl radical, is as follows:

(21) 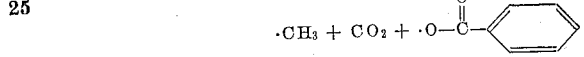

In this Example 8, as in Examples 1-6 inclusive, the free methyl radical is set free, and is the thing which removes an aprimary hydrogen atom from the intial smaller cyanoalkane to give methane and the new free radical of that initial smaller cyanoalkane; which in turn dimerizes to produce the desired compound with double the number of carbon atoms and double the number of cyano groups. Essentially, therefore, there is no difference whether diacetyl peroxide or acetyl benzoyl peroxide is used; since in both cases free methyl radicals are produced, and those free methyl radicals react with the initial smaller cyanoalkane.

On the same basis, other ar-alkacyl peroxides (aliphatic-aromatic peroxides) may be used; such for instance as propionyl benzoyl peroxide, butyryl benzoyl peroxide, acetyl naphthoyl peroxide, acetyl p-methylbenzoyl peroxide, or other peroxide of the general formula:

(22) $$R^x\text{—O—O—}R^y$$

in which $R^x$ represents an alkacyl group and $R^y$ represents an aracyl group. These may be used in all of Examples 1 to 6, with the limitations given in those examples for the alkacyl group. Furthermore, the highest yields are obtained when $R^x$ is the acetyl group.

Example 9

Similarly, unsymmetrical dialkacyl peroxides may be used in all the examples in place of the symmetrical peroxides named. Examples of these are:

Acetyl propionyl peroxide
Acetyl butyryl peroxide
Propionyl lauryl peroxide

However, no advantage accrues from these; and they are more difficult to make, and on the whole the yields obtained are poorer than when symmetrical peroxides are used.

I claim as my invention:

1. The process of producing larger cyanoalkanes which have a plurality of cyano groups from smaller cyanoalkanes which have fewer cyano groups and not to exceed 12 alkane carbon atoms and which are members of the class consisting of alkyl cyanides and phenyl alkyl cyanides and in which an alkane carbon atom directly attached to a cyano group is a primary carbon atom carrying at least one hydrogen atom; which consists in treating the said smaller cyanoalkane at elevated temperature and in the substantial absence of water with a diacyl peroxide in which at least one of the acyl groups is an alkacyl group of not more than four carbon atoms.

2. The process of producing larger cyanoalkanes from smaller cyanoalkanes as set forth in claim 1, in which the diacyl peroxide is a dialkacyl peroxide.

3. The process of producing larger cyanoalkanes from smaller cyanoalkanes as set forth in claim 1, in which an acyl group of the diacyl peroxide is the actyl group.

4. The process of producing larger cyanoalkanes from smaller cyanoalkanes as set forth in claim 1, in which the diacyl peroxide is diacetyl peroxide.

5. The process of producing larger cyanoalkanes from smaller cyanoalkanes as set forth in claim 1, in which the diacyl peroxide is an aralkacyl peroxide.

6. The process of producing larger cyanoalkanes from smaller cyanoalkanes as set forth in claim 1, in which the diacyl peroxide is benzoyl acetyl peroxide.

7. The process of producing larger cyanoalkanes from smaller cyanoalkanes as set forth in claim 1, in which the smaller cyanoalkane is an alkyl cyanide.

8. The process of producing larger cyanoalkanes from smaller cyanoalkanes as set forth in claim 1, in which the smaller cyanoalkane is propionitrile.

9. The process of producing larger cyanoalkanes from smaller cyanoalkanes as set forth in claim 1, in which the smaller cyanoalkane is dodecylnitrile.

10. The process of producing larger cyanoalkanes from smaller cyanoalkanes as set forth in claim 1, in which the smaller cyanoalkane is a phenylalkyl cyanide.

11. The process of producing larger cyanoalkanes from smaller cyanoalkanes as set forth in claim 1, in which the smaller cyanoalkane is benzyl cyanide.

MORRIS S. KHARASCH.

No references cited.

Certificate of Correction

October 3, 1950

Patent No. 2,524,319

MORRIS S. KHARASCH

It is hereby certified that error appears in the printed specification of the above numbered patent requiring correction as follows:

Column 1, line 9, strike out the closing parenthesis after "phenyl"; line 50, before "which" insert *in*; column 5, line 46, for "The" before "dimer" read *This*; column 6, line 29, Formula 11, for "CH$_2$" read ·CH$_3$; column 7, lines 32 and 33, Formula 19, for "H—C—CN"   read   H—C—CN column 9, line 18, for "actyl" read *acetyl*;

and that the said Letters Patent should be read as corrected above, so that the same may conform to the record of the case in the Patent Office.

Signed and sealed this 9th day of January, A. D. 1951.

[SEAL]

THOMAS F. MURPHY,
*Assistant Commissioner of Patents.*